United States Patent
Staurnes et al.

(10) Patent No.: US 8,713,662 B2
(45) Date of Patent: Apr. 29, 2014

(54) METHOD OF MONITORING AND CONFIGURING

(75) Inventors: Jarl Ove Staurnes, Fjellhamar (NO); Nicolai Grødum, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 1810 days.

(21) Appl. No.: 11/347,806

(22) Filed: Feb. 3, 2006

(65) Prior Publication Data

US 2006/0195568 A1    Aug. 31, 2006

(30) Foreign Application Priority Data

Feb. 4, 2005    (NO) .................................... 20050625

(51) Int. Cl.
*G06F 9/00*    (2006.01)

(52) U.S. Cl.
USPC ............................................ 726/11; 709/224

(58) Field of Classification Search
USPC ...................... 726/11, 12; 709/204, 223–225
See application file for complete search history.

(56) References Cited

U.S. PATENT DOCUMENTS

| | | | |
|---|---|---|---|
| 6,760,750 B1 | 7/2004 | Boneh et al. | |
| 2002/0093948 A1 | 7/2002 | Dertz et al. | |
| 2002/0141352 A1 | 10/2002 | Fangman et al. | |
| 2003/0046529 A1* | 3/2003 | Loison et al. ..................... | 713/2 |
| 2003/0125995 A1 | 7/2003 | Yamatari et al. | |
| 2004/0242328 A1* | 12/2004 | Blackburn et al. ............... | 463/42 |
| 2005/0102390 A1* | 5/2005 | Peterson et al. ............... | 709/224 |
| 2005/0149729 A1* | 7/2005 | Zimmer et al. ............... | 713/168 |
| 2006/0253901 A1* | 11/2006 | Roddy et al. ..................... | 726/11 |
| 2008/0216098 A1* | 9/2008 | Agarwal et al. ............... | 719/328 |

FOREIGN PATENT DOCUMENTS

| | | |
|---|---|---|
| CN | 1450766 A | 10/2003 |
| CN | 1469591 A | 1/2004 |
| EP | 0717544 A2 | 6/1996 |
| EP | 1427211 A1 | 6/2004 |
| JP | 2001-154953 | 6/2001 |
| WO | WO 0208856 A2 | 1/2002 |
| WO | WO 2004053761 A1 | 6/2004 |

OTHER PUBLICATIONS

Damiani, E., et al., "Fine Grained Access Control for SOAP E-Services," www10, May 2-5, 2001, Hong Kong.
Tandberg, "Tandberg Management Suite Administrator's guide", D13741, Rev 1, XP002559335, pp. 1-23 [online] 2004, Retrieved from the Internet: URL:http://www.tandberg.com/collateral/tms_documentation/TANDBERG_Mangement_Suite_Admin_Guide_D1374101.pdf> [retrieved on Dec. 8, 2009].

(Continued)

*Primary Examiner* — Kambiz Zand
*Assistant Examiner* — Suman Debnath
(74) *Attorney, Agent, or Firm* — Oblon, Spivak, McClelland, Maier & Neustadt, L.L.P.

(57) ABSTRACT

A method for managing and monitoring communication devices in a firewall/NAT protected network from a Management system outside the firewall/NAT protected network includes periodically and at predefined events opening an http connection and transmitting a request from the respective communication devices to the Management system through a firewall/NAT installation protecting the network, and when receiving said request in the management system, transmitting instructions and data to the communication devices from the management system in a http response through said http connection.

12 Claims, 1 Drawing Sheet

(56) References Cited

OTHER PUBLICATIONS

Tandberg, "Tandberg 770 MXP", XP-002559336, (p. 2 only), Jul. 2004 Retrieved from the Internet: URL:http//omnipresence.com/PDFs/TANDBERG_770MXP.pdf> [retrieved on Dec. 8, 2009] * p. 2 *.

Tandberg, "Tandberg Management Suite v9 Release Document", D50302, Rev 1.8, XP-002559337, pp. (1-38) Retrieved from Internet URL:http//ftp.tandberg.com/pub/software/tms/Tandberg%20software%20Release %20-%TMS%20(9).pdf>[retrieved on Dec. 8, 2009].

* cited by examiner

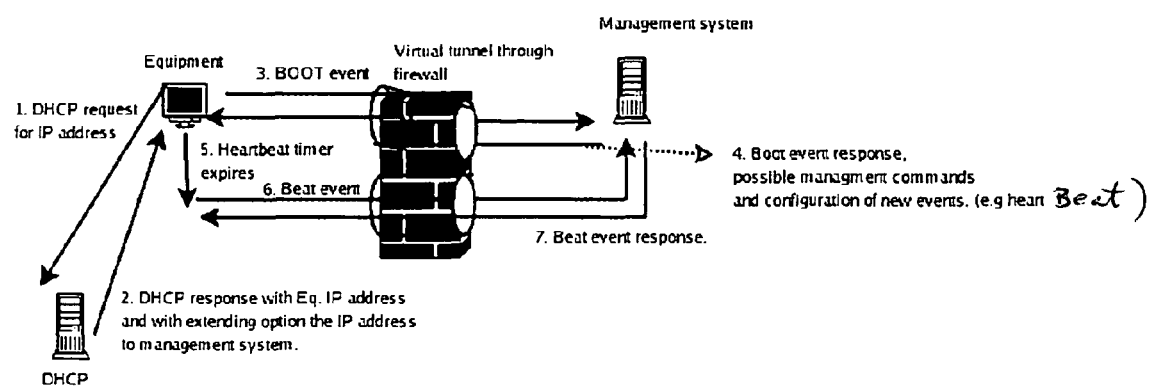

METHOD OF MONITORING AND CONFIGURING

RELATED APPLICATION

This application claims priority under 35 U.S.C. §119 or 365 to Norwegian Application No. 20050625, filed Feb. 4, 2005. The entire teachings of the above application are incorporated herein by reference.

TECHNICAL FIELD

The present invention relates to monitoring, configuration and administrating IP terminals behind Firewalls and Network Address Translation (NAT) traversing nodes.

BACKGROUND

Conventional conferencing systems comprise a number of end-points communicating real-time video, audio and/or data streams over and between various networks such as WAN, LAN and circuit switched networks.

A number of conference systems residing at different sites may participate in the same conference, most often, through one or more MCU's (Multipoint Control Unit) performing i.a. switching functions to allow the audiovisual terminals to intercommunicate properly.

As videoconferencing involves various recourses and equipment simultaneously interoperating at different locations and capabilities, there is a need for the possibility to manage the resources involved both for scheduled and ad hoc conferences.

Conferencing systems are therefore often provided with a management tool. The management tool may i.a. include a resource scheduler, a monitor module and a routing module.

As early conferencing equipment was ISDN based, it has now started migrating to IP based terminals and infrastructure. IP-based equipment is often connected to a Local Area Network (LAN), which is protected by Firewalls and NAT installations. This introduces a new problem in connecting between management systems and the associated nodes and equipment. The management system might as well be operating from outside the LAN, meaning that communication towards the managed nodes and endpoints will have to force through Firewalls and NAT's. This is a problem due to a most often strict policy for what is allowed to pass through a firewall. Conventionally, all communication sessions through a firewall have to be initiated from inside. This means that all requests initiated from a management system to a device located inside a LAN would be rejected by the firewall. In addition, the management system would not know the terminating IP address of the device as the NAT installation hides the actual addresses of the devices.

Thus, the equipment may be able to transmit their reports out to the administration tool if the firewall is configured to let these reports out, but the administrator would have difficulties configuring and otherwise administrating the equipment, as it is prevented from requesting devices behind the firewall.

Allowing the reports out through the firewall may cause other information leaking out that was not intended to.

Most IP equipment of prior art uses SNMP (Simple Network Management Protocol) for monitoring purposes. The equipment sends a trap to the management system when something happens using a UDP/IP packet to a specific port. The management system might then probe the equipment using another specified port. For this to work through a firewall, the SNMP ports must be opened. This poses a very high security risk because mostly all IP equipment has SNMP, and thus the entire network would be exposed to the outside. Also the security mechanisms of SNMP is rather weak and malicious parties might intercept the messages and pretend to be the management system and issue the same administrator commands as the management system and alter the equipment configurations.

Another problem is that SNMP uses a specific port for the management system to access the equipment, thus if the management system is outside the firewall and NAT is in use, only one of the equipment on the inside could be accessed as the firewall could only map one port to one address on the inside. A way to work around this is to make a tunnel through the firewall and a specific utility on the inside (proxy) that would redirect the connection to the equipment. However, this would require some special extension in the management system and quite a lot of configurations.

SUMMARY

It is an object of the present invention to provide a method avoiding the above described problems.

The features defined in the independent claims enclosed characterise this method. The present invention discloses a method for managing and monitoring communication devices in a firewall/NAT protected network from a management system outside the firewall/NAT protected network by periodically and at predefined events opening a hypertext transfer protocol (http) connection and transmitting a request from the respective communication devices to the management system through a firewall/NAT installation protecting the network, and when receiving said request in the management system, transmitting instructions and data to the communication devices from the management system in a http response through said http connection.

BRIEF DESCRIPTION OF THE DRAWINGS

In order to make the invention more readily understandable, the discussion that follows will be supported by the accompanying drawing, FIG. 1 is a block diagram showing the data flow between an endpoint and a management system according to one embodiment of the present invention.

DETAILED DESCRIPTION

In the following, the present invention will be discussed by describing a preferred embodiment, and supported by the accompanying drawings. However, people skilled in the art will realize other applications and modifications within the scope of the invention as defined in the enclosed claims.

As already mentioned in the background section, firewalls allow establishment of communication sessions initiated from inside the protected area, but not in the opposite direction e.g. from the public Internet into the protected area. Particularly, most firewalls have HTTP (port 80) and HTTPS (port 443) open from the inside to the outside of the firewall. When a TCP connection then is established from the inside to a verified area on the outside (server, node, terminal etc.), the verified area can transfer information back to the originating system. This possibility is utilised in the present invention for managing IP equipment behind firewalls/NAT installations relative to the management system.

According to the invention, the inside equipment periodically sends data in an initiating request, allowing the management system to send configuration or other administration command in the response. By selecting proper initiating request intervals and/or defining proper initiating events, a system on the inside of a firewall can be configured, monitored and administrated from the outside without compromising with security. Preferably, the secure protocol HTTPS is used as the transport mechanism. HTTPS is a protocol standardized by IETF designed to send individual messages securely through the Internet. The only configuration that is required when deploying new equipment is setting the IP address of the administration tool on the equipment. However, by using an extension to DHCP (Dynamic Host Configuration Protocol), the administration tool address can be configured in the DHCP server once and then all equipment will automatically be configured when they are connected to the network.

In a preferred embodiment of the invention, an event scheme defines when the equipment behind the firewall sends request posting an event with certain information (different types depending on the situation) or simply a repeating request, and then the management system in response will issue configuration and other types of commands for managing the equipment. The request is preferably a SOAP request, which is a request according to the Simple Object Access Protocol compatible with http for exchanging information in an Internet environment.

For the event scheme to be activated, the equipment has to retrieve the address of the management system. This is preferably provided automatically in that the equipment is configured to utilise DHCP for obtaining its IP address configuration. When the equipment is turned on, a query is sent to a DHCP server. The DHCP server then responds with a packet containing the IP configuration and other optional settings. By extending the DHCP packet using a free option, the equipment can then receive the IP address of the management system.

Further, when the equipment connects to the network, it first checks if it has received an IP address to the management system from DHCP. If so, the address is used in conjunction with a stored service path (configurable, e.g. "/public/externalmanager.asmx") to make a URL which it then tries to establish an HTTP or HTTPS connection to the management system.

Alternatively, if no management system address is received from DHCP, or DHCP is not in use, a (pre-configured) stored address to the management system is then used.

After the URL has been created and the HTTPS (TCP connection) has been established, a SOAP request is generated. By using SOAP the service mechanism (SOAP+WSDL=web services) can very easily be implemented in a management system, as it is an existing standard.

The first SOAP request sent from the equipment to the administration tool defines a "Boot" event. This is a special registration event that is used to signal to the administration tool that the equipment is just connected to the network (or booted up).

In the top heading of a SOAP request associated with a "Boot" event is an identification element including information about the equipment for the management system to uniquely identify it.

On response to the "Boot" event SOAP request, the management system sends a set of parameters to be used by the equipment for the succeeding communication with the management system, e.g. defining requests intervals and event schemes. Below are a few examples of parameters depicted.

HeartBeatInterval—A number defining the frequency of heartbeat events, i.e. periodical SOAP request, in seconds.

FilesToDownload—A group parameter containing a SoftwareUpgrade parameter informing the equipment to download new software. The parameter contains the address and authorization key. Further, a set of FileToDownload parameters simply mapping a network address file to a local file path to which the equipment should download.

Management—This parameter element is the key to managing. All event responses have this. A set of sub elements is used to separate the different types of administration commands. Examples of such commands are Command, Configuration and Directory is in use.

Expressions—Group element holding several Expression definitions e.g. defining different events.

Whenever a heartbeat frequency is defined as a result of a previous event response, a timer is started with the number of seconds specified between each "heartbeat". When it expires, an event is sent to the management system as a "Beat" event type.

The response from the management system contains the same parameters as the Boot event.

Whenever an Expressions element is returned in a previous event response, each of the Expression elements are registered in the change machinery. When a change in the system satisfies one of the registered expressions, an event is sent to the management system as an Expression event type. Within the event request, the expression that triggered the event is passed as a parameter to the management system. The response from the management system is the same parameters as for the Boot event. However, any HeartBeat or Expressions elements will override previous defined events.

By referring to FIG. 1, an example of data flow between a videoconference terminal behind a firewall and a management system is discussed.

The terminal sends a DHCP request for retrieval of its own IP address configuration (1). The DHCP server returns information, with extension to supply management system IP address (2).

After receiving the information from the DHCP server, the terminal sends a BOOT event to the management system using the IP address that was retrieved or pre-configured in the previous steps (3). The event is sent over an HTTP connection, and by doing so, a virtual tunnel is made through the firewall so that a two-way communication with the management system is established.

Thereafter, the management system sends a (HTTP) response through the tunnel (4) where it may instruct the equipment to issue new events in the future (a timed event, or when changes occur matching an expression). Along with these instructions, the management system may issue other administration commands, e.g. configurations or control commands.

If the management system requested a heartbeat event, a timer in the equipment was created as specified (5).

When the heart beat timer expires, the equipment sends a new event (BEAT) to the management system (6). Again, opening a new HTTP connection and thus creating a new communication tunnel.

Finally, the management system responds with possible new instructions (7).

The usage of the present invention is particularly advantageous when deploying equipment in larger numbers that require initial configuration. The mechanism can be implemented as a part of a solution to ease this process. By having a configuration server with the initial configuration for the equipment stored, this server can return configuration data and instruct the equipment to download files or upgrade firmware, even when the equipment is behind a NAT firewall/ router. This allows an administrator to be able to roll out new equipment without configuring it beforehand. The only step necessary is to register the equipment with the configuration server if it is not configured to give configuration data to any system connecting to it. The equipment would typically use DHCP to locate the configuration server.

Another possibility that opens is a more flexible mechanism for pro-active notifications for the administrator. By implementing a mechanism on the configuration server that would send e-mails based on events from the equipment, the administrator could configure feedback expressions that would supply him with notifications of his own choice. The configuration server could also send e-mails when a heartbeat event has not been received, to inform that a unit is offline.

Further, by using the heartbeat frequency in a dynamic manner, the configuration server is allowed to schedule contact with the equipment at any time in the future upon receiving the next request. E.g. if the standard heartbeat interval is 5 minutes, and the configuration server would like to issue a command on the equipment in 13 minutes, the configuration server could set it to 3 minutes on the request before the command should be executed. At the time the command is to be executed on the equipment, the equipment would contact the configuration server with the heartbeat request, get the command in the response, and the heartbeat interval would be set back to 5 minutes.

The disadvantage of using the event scheme for issuing administration commands is that the management system cannot at any time send these commands but has to wait for the next event. By carefully selecting the expressions and heart beat interval, this would not be a big issue in practice. However, by keeping the tunnel up (in fact, this is the default behaviour of HTTP 1.1) and extending the HTTP protocol so that requests can be issued from both sides (like RTSP, real time streaming protocol). The management system could send a new form of request for issuing management commands.

The problem with this is that either of the equipment, firewall or administrator server can at any time close the tunnel if the link is inactive for a period of time. Therefore this approach will not guaranty more control for the management system.

The event model though will always reconnect the tunnel if necessary and are therefore guaranteed to work as defined.

One of the advantages of the present invention is that there is no need for configuring the firewall. Also, by using the DHCP extensions, the only configuration needed is to install the IP address for management system on the DHCP server once. Then all new equipment will automatically connect. Without the DHCP extension in use, all new equipment must be configured with this one IP address for the administration tool. For other specialized administration protocols, the firewall must be configured to allow this new protocol through.

Further, by using the HTTPS protocol, a secure connection is made both ways so no eavesdrop or insertion of malicious commands can happen.

Another advantage is that there is no need to make new software for the equipment for generating new events as it is when using SNMP. In SNMP, a new trap handler must be created in the equipment if new reports are needed. With the event scheme using expressions; the management system can define the event as specific or general as convenient. All that is needed are a specification of the XML documents on the equipment and an XPath query machinery than can trigger on changes on the equipment.

Since the model is using HTTP and HTTP is a well-known protocol that is in extensible use, all firewall will be supported. Also, they are normally pre-configured to allow HTTP traffic out of the firewall thus a deployment of equipment and administration tools can be done without involving the firewall.

| | |
|---|---|
| WAN | Wide Area Network |
| LAN | Local Area Network |
| MCU | Multipoint Control Unit |
| ISDN | Integrated Services Digital Network |
| IP | Internet Protocol |
| NAT | Network Address Translation |
| SNMP | Simple Network Management Protocol |
| UDP/IP | User Datagram Protocol/Internet Protocol |
| HTTP | HyperText Transfer Protocol |
| HTTPS | HyperText Transfer Protocol Secure |
| TCP | Transmission Control Protocol |
| IETF | Internet Engineering Task Force |
| DHCP | Dynamic Host Configuration Protocol |
| SOAP | Simple Object Access Protocol |
| URL | Uniform Resource Locator |
| RTSP | Real Time Streaming Protocol |

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for managing and monitoring communication devices in a firewall/NAT protected network from a management system outside the firewall/NAT protected network, comprising:

periodically and at predefined events opening a hypertext transfer protocol (http) connection from inside a firewall/NAT installation protecting the network and transmitting a request from the communication devices to the management system through the firewall/NAT installation protecting the network;

when receiving said request in the management system, transmitting instructions and data to the communication devices in a http response through said http connection; and when one of the communication devices is connected to the network for a first time, opening an initial http connection from inside the firewall/NAT installation and transmitting a BOOT request through said firewall/NAT installation from said one of the communication devices, when receiving said BOOT request in the management system, transmitting configuration data and parameters to said one of the communication devices from the management system, said configuration data and parameters at least defining time intervals between periodical requests and events triggering requests to be transmitted from said one of the communication devices to the management system; and prior to opening the initial http connection, transmitting from said one of the communication devices to a DHCP server a DHCP request requesting an IP address of said one of the communication devices, and receiving from the DHCP server a DHCP response including both said IP address of said one of the communication devices and an IP address of the management system.

2. The method according to claim 1, wherein said request is defined according to a Simple Object Access Protocol.

3. The method according to claim 1, wherein the http connection is an https connection.

4. The method according to claim 1, wherein prior to opening the initial http connection, the method comprises:
transmitting from the DHCP server to the one of the communication devices said DHCP response including both said IP address of said one of the communication devices and said IP address of the management system.

5. The method according to claim 4, wherein said request is defined according to the Simple Object Access Protocol.

6. The method according to claim 4, wherein the http connection is an https connection.

7. The method according to claim 1, wherein said transmitting instructions and data includes transmitting at least one of the following:
new time intervals between periodical requests to be transmitted from the communication devices to the management system overriding any existing ones;
definitions of new events initiating event requests to be transmitted from the communication devices to the management system;
a command for initiation of download of new software from the management system to the communication devices; and
a command for instructing the communication devices to transmit status information to the management system.

8. The method according to claim 7, wherein the communication devices are IP based conference endpoints or equipment.

9. The method of claim 1, further comprising:
receiving, at the management system, a communication from said one of the communication devices in accordance with the time intervals and events defined in the configuration data and parameters.

10. The method of claim 1, wherein
said transmitting transmits said BOOT request through said firewall/NAT installation from said one of the communication devices to said management system outside said firewall/NAT protected network using said IP address of said management system included in said DHCP response.

11. A method for managing and monitoring communication devices in a firewall/NAT protected network from a management system outside the firewall/NAT protected network, comprising:
receiving, at the management system outside, a BOOT request originating from a communication device inside a firewall/NAT installation that connected to the network for a first time on a hypertext transfer protocol (http) connection opened by the communication device from inside the firewall/NAT installation protecting the network, and prior to the http connection being opened, the communication device transmitting to a DHCP server a DHCP request requesting an IP address of the communication device, and receiving from the DHCP server a DHCP response including both said IP address of the communication device and an IP address of the management system; and
in response to receiving said BOOT request, transmitting configuration data and parameters from the management system to the communication device, said configuration data and parameters at least defining time intervals between periodical requests and events triggering requests to be transmitted from the communication device to the management system.

12. The method of claim 11, further comprising:
receiving, at the management system, a communication from the communication device in accordance with the time intervals and events defined in the configuration data and parameters.

* * * * *